Patented Feb. 16, 1932

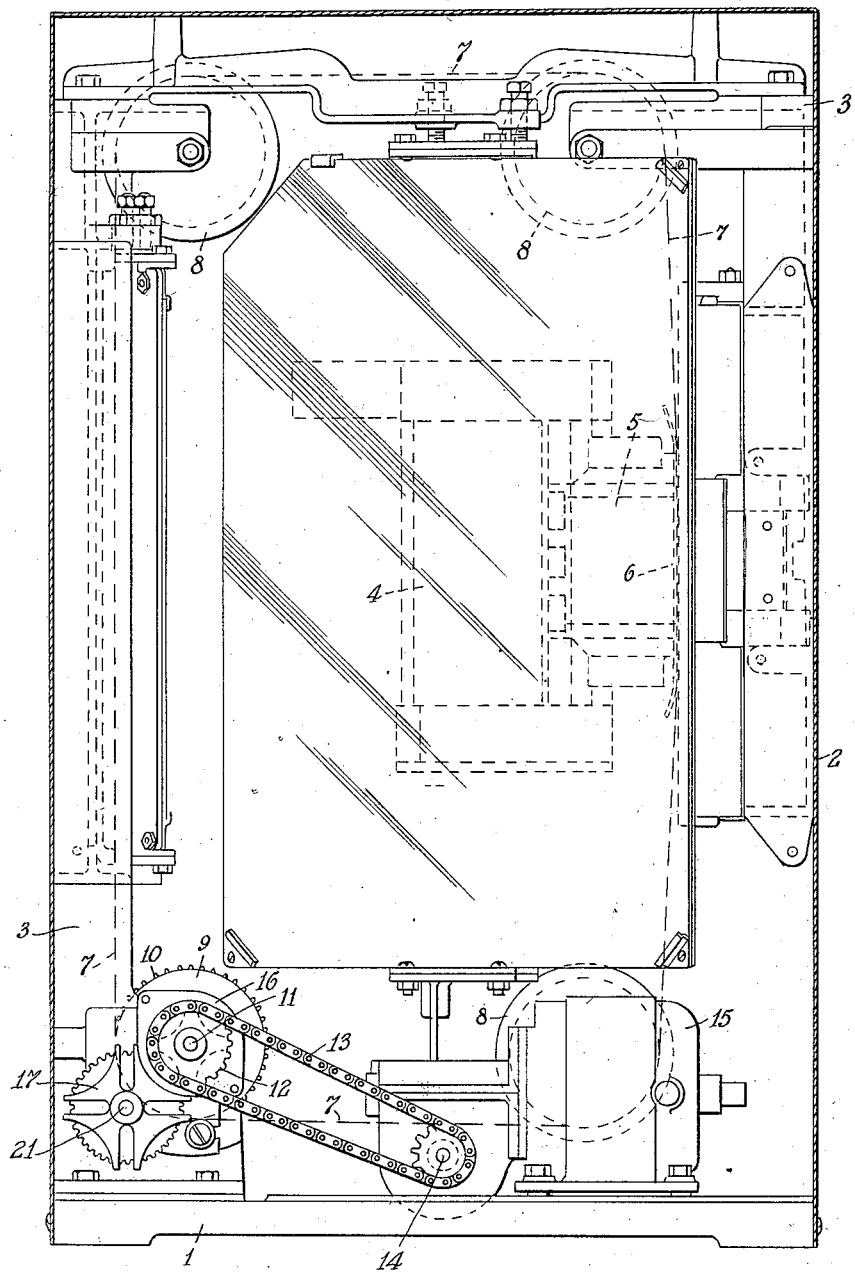

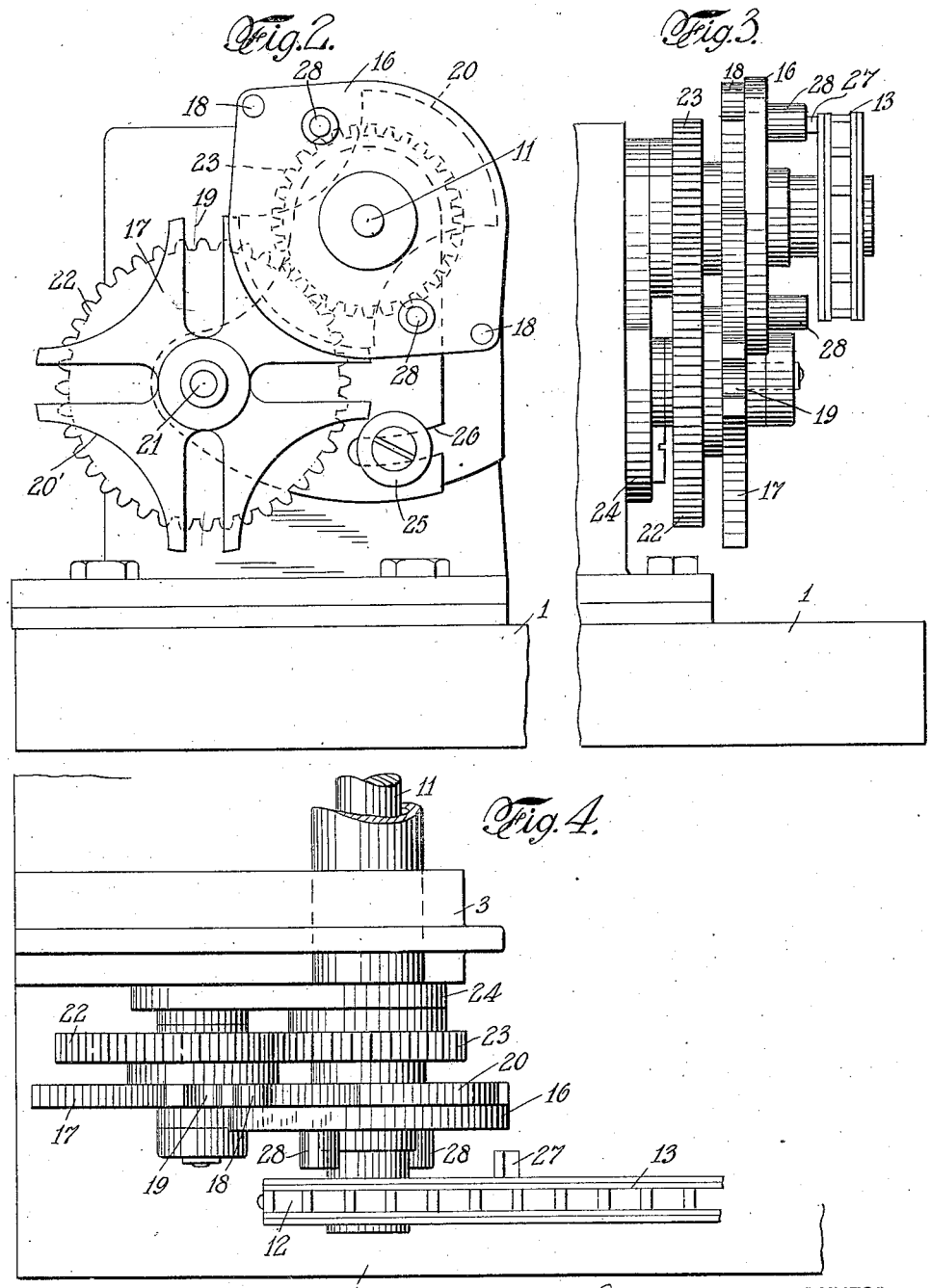

1,845,476

UNITED STATES PATENT OFFICE

AUGUST H. BLOHM, OF ORANGE, NEW JERSEY, ASSIGNOR TO TRANS-LUX DAYLIGHT PICTURE SCREEN CORPORATION, OF NEW YORK, N. Y., A CORPORATION OF DELAWARE

FEEDING DEVICE

Application filed December 18, 1926. Serial No. 155,681.

This invention relates to a novel and improved form of feeding device for use particularly in a projector. In the co-pending application of Wilfred T. Birdsall, Serial No. 114,407 filed June 8, 1926, there is described and claimed a projector embodying a flexible conveyor of metal to which are attached a plurality of slides. The conveyor is provided with sprocket holes in which engage the teeth on a sprocket wheel which is intermittently rotated, this arrangement forming means for imparting movement to the conveyor. My invention is particularly adapted to give the desired intermittent motion to the sprocket wheel in the type of projector referred to above, although it is not limited to that use.

In operating a projector it is desirable to exhibit a slide for a relatively long time and then to change from one slide to another in a relatively short time. In other words, the ratio of dwell to movement should be as large as it is possible to get it, but with existing intermittent movements it is difficult to obtain a very large ratio. Therefore one of the principal objects of my invention is to provide means for intermittently rotating a shaft at intervals, the ratio of dwell to movement being relatively large. This object I achieve by employing a couple formed of a driving and a driven element, the driving element being adapted to intermittently rotate the driven element and hold it against rotation between the intermittent movements thereof, together with means for intermittently actuating the driving element.

Other objects and advantages of the invention will be apparent during the following description when read in connection with the accompanying drawings forming a part of this application and in which:

Figure 1 is a vertical sectional view through a projector having my invention embodied therein.

Figure 2 is an enlarged elevation of the intermittent couple, parts being omitted.

Figure 3 is a view of the structure shown in Figure 2 as viewed from the left of that figure.

Figure 4 is a plan of the structure shown in Figure 2, with the addition of the parts omitted from that figure.

Referring now to the drawings, the numeral 1 designates a suitable base supporting a casing 2 and a frame 3 therein. Supported on the frame within the casing is a suitable projection apparatus, the details of which do not need to be described herein. It is sufficient to say that the apparatus comprises a lamp house 4, and a condenser housing 5 at the front of which is provided a plurality of guides 6 over which travels a conveyor 7 which supports a plurality of slide holders. The conveyor is mounted on a plurality of rollers 8 and is operated by means of a sprocket roller 9 which is provided with teeth 10 adapted to be received within apertures in the conveyor.

The matter on a slide holder is adapted to be projected on to a screen by any suitable means, not shown, and it is understood that the sprocket roller 9 is given an intermittent rotation to bring the slides consecutively into position in front of the condenser housing 5. It is to the means for imparting this intermittent rotation that my invention relates.

The sprocket roller 9 is secured to a shaft 11 journaled in the frame 3, and rotatably journaled on one end of the shaft 11 is a sprocket 12 engaging a chain 13 which is driven from the shaft 14. This shaft is driven by suitable gearing from a motor 15 and is continuously rotating during the operation of the projector. Also rotatably journaled on the shaft 11 is the driven element 16 of the intermittent couple. The couple may take a variety of forms, but I have shown it herein as comprising a Geneva movement of which the driving element 16 is a pin wheel and the driven element 17 is a star wheel. The pin wheel is provided with oppositely disposed pins 18 adapted to enter one of the slots 19 of the star wheel and intermittently rotate the star wheel through a quarter revolution, in this embodiment. When the star wheel is not being rotated it is held in position by means of one of the oppositely disposed cam surfaces 20 on the pin wheel engaging one of the surfaces 20' on the star wheel, in a manner well known in this type of couple.

The star wheel 17 is mounted on a counter-shaft 21 to which is also attached a gear 22 meshing with a gear 23 which is secured to the shaft 11. The counter-shaft 21 is mounted in a plate 24 which is pivoted on the shaft 11. The plate is secured in position by means of a screw 25 which engages in a slot 26 in the plate and by this means the driven element 17 may be adjusted about the axis of the driving element.

The driving element is given an intermittent actuation by means of a dog 27 mounted on the chain 13 and which is adapted to contact with one of a pair of oppositely disposed projections 28 on the driving element. Then it will be obvious that upon the dog 27 engaging one of the projections 28, the driving element will be actuated and one of the pins 18 thereon will enter one of the slots 19 and give the shaft 21 a quarter rotation. This rotation will be imparted, through the gearing 22 and 23, to the shaft 11. After this operation has taken place one of the cam surfaces 20 will engage one of the bearing surfaces 20' on the star wheel and hold the star wheel against rotation until the dog 27 engages the next projection 28. It will be noted that the dog will engage a projection 28 and carry it around through substantially a half revolution of the driving element and will then be released from the projection, this taking place when the parts are in the approximate position shown in Figure 2. The chain and dog together with the sprocket 12 have been omitted from Figure 2 for clearness of illustration.

It will be apparent that the above arrangement is such that the ratio of dwell to movement is high and may be varied between quite wide limits. The length of the chain 13 and the number of dogs thereon provide a flexibility which will permit of adjustment of the above ratio to meet a wide variety of conditions. Moreover, the operation is smooth because of the fact that the first engagement of moving parts takes place between the dog 27 and a projection 28 on the driving element. The movement of the driving element is then transmitted gradually to the driven element and then through the gearing 22 and 23 to the shaft 11. Therefore the initial shock is taken up by these parts, and does not reach the shaft 11.

The gearing furnishes another means for varying the movement as desired. The size of slides used on the conveyor may be varied and then it is necessary to vary the amount of feed and this may conveniently be done by varying the gears 22 and 23. During the inactive period of the shaft 11 the parts are locked in position by the contacting surfaces 20 and 20' and no other locking device is necessary. Even though the driving element does not always stop in the same position after it has been actuated by the dog 27, nevertheless the surfaces 20 and 20' will be in engagement and will hold the driven element in correct position, and therefore it is not necessary to provide means for accurately stopping the rotation of the driving element at a fixed point. The driven element will always be accurately started and stopped at the desired times which are governed by the engagement of the pins 18 with the walls of the slots 19 and it will be evident that these are independent of the time when the dog 27 may engage or disengage from one of the projectors 28.

While I have shown and described my invention as embodied in a specific machine, it is to be understood that I am not limited by that illustration and I consider myself entitled to all such changes as fall within the scope of the appended claims.

I claim:

1. In combination, a driven element, a driving element adapted to impart intermittent motion to said driven element, and means to intermittently actuate said driving element, said means comprising a continuously rotating shaft, a chain operated by said shaft and movable eccentrically and concentrically with respect to the axis of rotation of said driving element, a plurality of projections on said driving element and a dog on said chain adapted to contact with one of said projections.

2. In combination, a star wheel, a pin wheel adapted to give intermittent motion to said star wheel, and means to intermittently actuate said pin wheel, said means comprising a continuously rotating shaft, a chain operated by said shaft and movable eccentrically and concentrically with respect to the axis of rotation of said pin wheel, a plurality of projections on said pin wheel and a dog on said chain adapted to contact with one of said projections.

3. In combination, a driven element, a driving element adapted to impart intermittent motion to said driven element, a shaft upon which said driving element is journaled, a sprocket journaled on the same shaft, a chain engaging said sprocket and adapted to drive the same, a projection on said driving element, and a dog on said chain adapted to contact with said projection to intermittently actuate said driving element.

4. In combination, a Geneva couple comprising a star wheel, a pin wheel adapted to intermittently rotate said star wheel and to hold it stationary between said intermittent rotations, a projection on said pin wheel, a sprocket mounted concentrically with said pin wheel, and a chain engaging said sprocket and having a dog thereon adapted to engage said projection to intermittently actuate said pin wheel.

5. In combination, a Geneva couple comprising a star wheel, a pin wheel adapted to intermittently rotate said star wheel and to hold it stationary between said intermittent rotations, a projection on said pin wheel, a sprocket mounted concentrically with said pin wheel, a chain engaging said sprocket and having a dog thereon adapted to engage said projection to intermittently actuate said pin wheel, and means to adjust the star wheel about the axis of the pin wheel.

In testimony whereof, I have affixed my signature to this specification.

AUGUST H. BLOHM.